(12) United States Patent  
Banter et al.

(10) Patent No.: US 7,009,504 B1
(45) Date of Patent: Mar. 7, 2006

(54) RECONFIGURABLE VEHICLE ACCESSORY CONTROL PANEL

(75) Inventors: Charles B. Banter, Northville, MI (US); Robert M. Schmidt, Livonia, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/915,528

(22) Filed: Aug. 10, 2004

(51) Int. Cl.
*B60Q 1/00* (2006.01)

(52) U.S. Cl. ............... 340/438; 340/815.1; 180/90; 345/173; 362/23; 700/17

(58) Field of Classification Search ............. 340/438, 340/815.1; 180/90; 345/173–177; 362/23, 362/25–30; 700/17–18, 83–85
See application file for complete search history.

(56) References Cited

U.S. PATENT DOCUMENTS

| | | | |
|---|---|---|---|
| 5,539,429 A * | 7/1996 | Yano et al. ............ 345/173 |
| 5,801,637 A * | 9/1998 | Lomholt ............ 340/815.69 |
| 6,025,726 A * | 2/2000 | Gershenfeld et al. ....... 324/671 |
| 6,240,347 B1 * | 5/2001 | Everhart et al. ............ 701/36 |
| 6,282,464 B1 * | 8/2001 | Obradovich ............ 701/1 |
| 6,322,122 B1 | 11/2001 | Burns et al. |
| 6,429,542 B1 * | 8/2002 | Furuya et al. ............ 307/9.1 |
| 6,529,125 B1 * | 3/2003 | Butler et al. ............ 340/461 |
| 6,559,773 B1 * | 5/2003 | Berry ............ 340/815.4 |
| 6,650,345 B1 * | 11/2003 | Saito et al. ............ 715/764 |
| 6,666,492 B1 | 12/2003 | Schmidt et al. |
| 6,709,041 B1 | 3/2004 | Hotary et al. |
| 2001/0030435 A1 | 10/2001 | Burns et al. |
| 2003/0006892 A1 * | 1/2003 | Church ............ 340/439 |
| 2004/0041432 A1 | 3/2004 | Baker et al. |
| 2004/0041933 A1 * | 3/2004 | Fredlund et al. ........ 348/333.01 |

* cited by examiner

*Primary Examiner*—Thomas J. Mullen, Jr.
*Assistant Examiner*—Samuel J Walk
(74) *Attorney, Agent, or Firm*—MacMillan, Sobanski & Todd, LLC

(57) ABSTRACT

A vehicle accessory control panel is provided for controlling at least two vehicle accessory systems. A plurality of switches is reconfigurable for providing at least two sets of switch functions. A plurality of graphics is provided for identifying the switch functions. A plurality of illumination elements is provided for illuminating the plurality of graphics. The respective set of illumination elements is activated for illuminating a respective set of graphics identifiable with a selected set of accessory switch functions. A first set of graphics identifies a first set of accessory switch functions in response to enabling the first set of accessory switch functions. A second set of graphics identifies a second set of accessory switch functions in response to enabling the second set of accessory switch functions. A wakeup protocol includes a sequential illumination learning mode scheme for visually identifying each respective set of accessory switch functions.

17 Claims, 4 Drawing Sheets

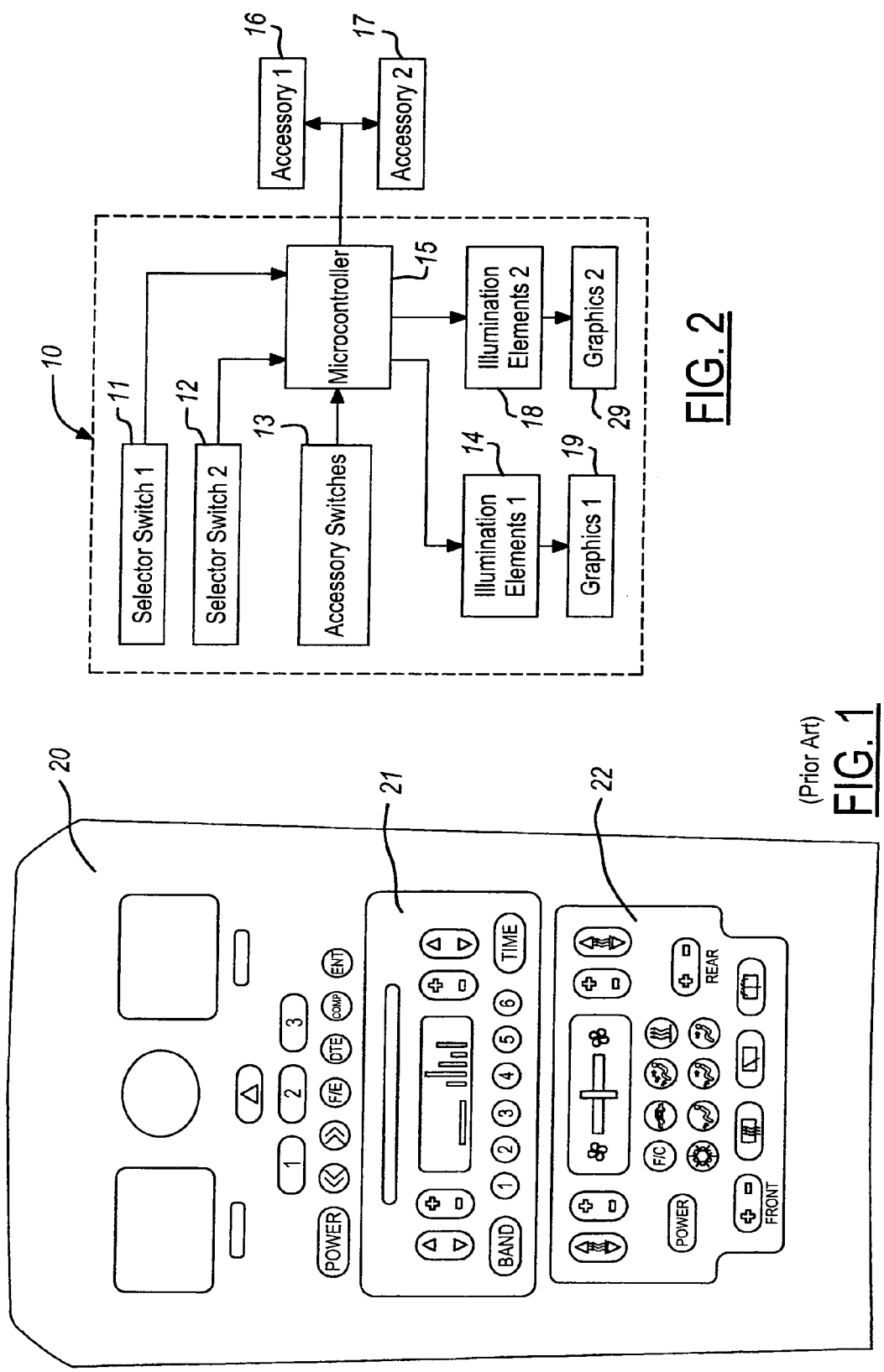

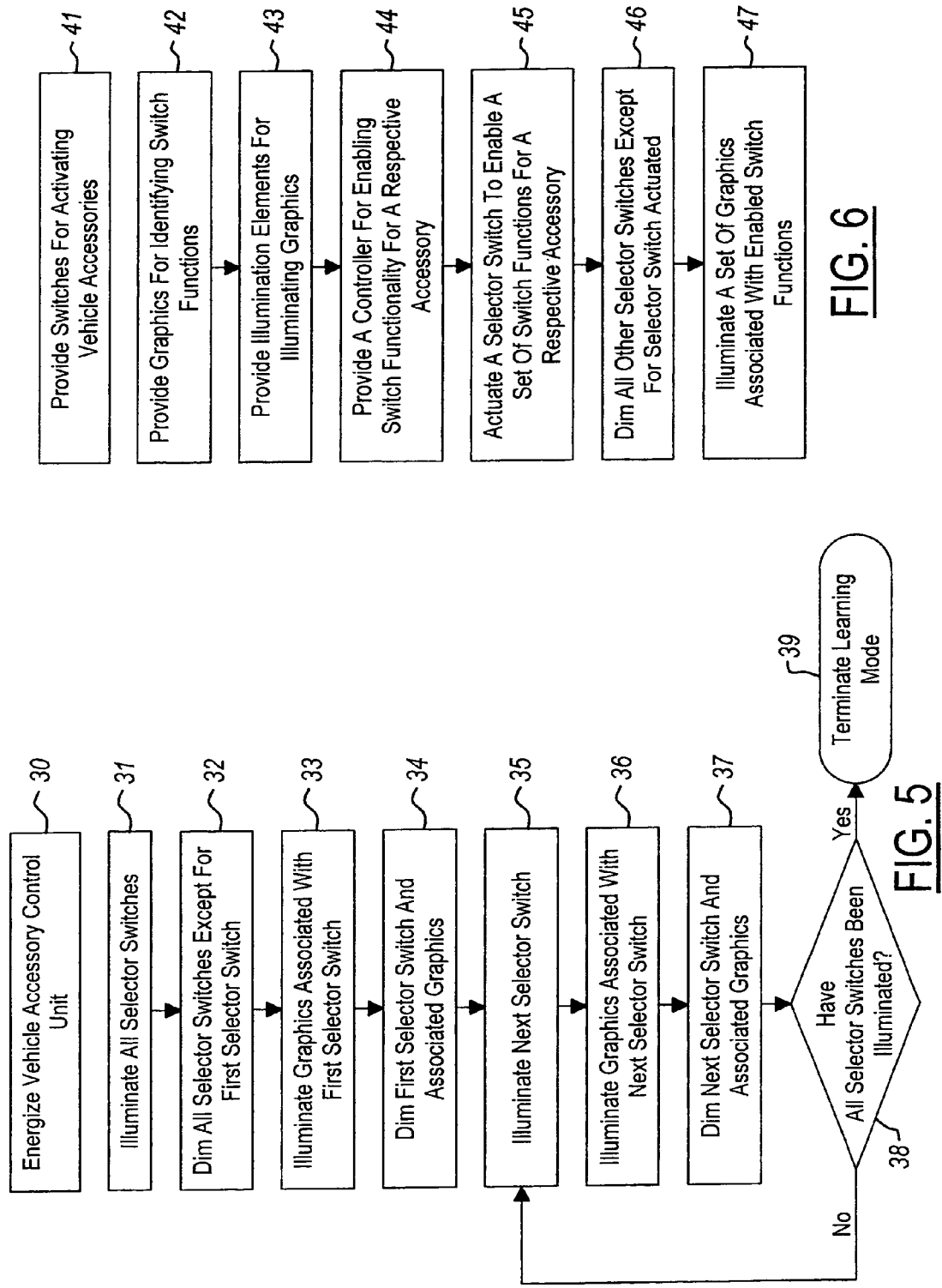

RECONFIGURABLE VEHICLE ACCESSORY CONTROL PANEL

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates in general to a vehicle accessory switch control panel for activating vehicle accessories, and more particularly, to a reconfigurable vehicle accessory switch control panel.

2. Description of the Related Art

Vehicle accessory input controls typically consist of a plurality of buttons, knobs, or menu driven display screens located on an instrument panel within the passenger compartment of a vehicle for controlling accessories such as multimedia, navigation, and climate control systems. Often the center console area of the instrument panel is cluttered with a large number single push button switches to control as many of the vehicle accessory functions as possible. A large number of switches is often aesthetically displeasing and confusing to a user. The more switches required to provide the ever increasing accessory functionality, the smaller the size each switch becomes in order to package them in the available space. Typically a user desires larger size switches in an uncluttered center console area.

Reconfigurable display units have been utilized to overcome the cluttered appearance of the center console area. Reconfigurable display units utilize either display screens or touch screens with menu driven options. The number of switches can be greatly decreased with the utilization of only a few switches to control the menu driven options. However, complicated menu structures are cumbersome to use because the user is required to transition through several menu screens in order to get to the desired function. Familiarity of the switch locations for activating vehicle accessories greatly decreases the time required to locate and actuate a switch for activating a vehicle accessory. When using reconfigurable displays, multiple menus may have to be accessed in order to activate an accessory. Simple operation and familiarity of switch locations are desirable to avoid a distraction to the driver operating the vehicle accessories.

SUMMARY OF THE INVENTION

The present invention has the advantage of utilizing reconfigurable switches for activating and controlling vehicle accessories, wherein reconfigurable switches may be configured to provide at least two sets of switch functions dependent upon the selected accessory enabled. The present invention has the further advantage of implementing a wakeup protocol which includes a sequential illumination learning mode scheme for visually identifying the controllable accessories and their respective switches functions.

In one aspect of the present invention, a vehicle accessory control systems is provided for controlling at least two vehicle accessory systems. A plurality of switches is reconfigurable for providing at least two sets of switch functions. A plurality of graphics is provided for identifying the switch functions. A plurality of illumination elements is provided for illuminating the plurality of graphics. The switches are reconfigurable in first and second non-simultaneous modes to enable a respective set of accessory switch functions for controlling a respective vehicle accessory system. The respective set of illumination elements is activated for illuminating a respective set of graphics identifiable with a selected set of accessory switch functions. A first set of graphics identifies a first set of accessory switch functions in response to enabling the first set of accessory switch functions. A second set of graphics identifies a second set of accessory switch functions in response to enabling the second set of accessory switch functions. A wakeup protocol includes a sequential illumination learning mode scheme for visually identifying each respective set of accessory switch functions.

BRIEF DESCRIPTION OF THE DRAWINGS

FIG. 1 is a perspective view of a center console stack with segregated accessory controls.

FIG. 2 is a block diagram of an integrated accessory control unit according to a preferred embodiment of the present invention.

FIG. 5 illustrates a method for implementing a learning mode scheme for enabling a respective set of accessory functions according to a preferred embodiment of the present invention.

FIG. 6 illustrates a method for controlling vehicle accessories from the vehicle accessory control system according to a preferred embodiment of the present invention.

DETAILED DESCRIPTION OF PREFERRED EMBODIMENTS

Figure 3:
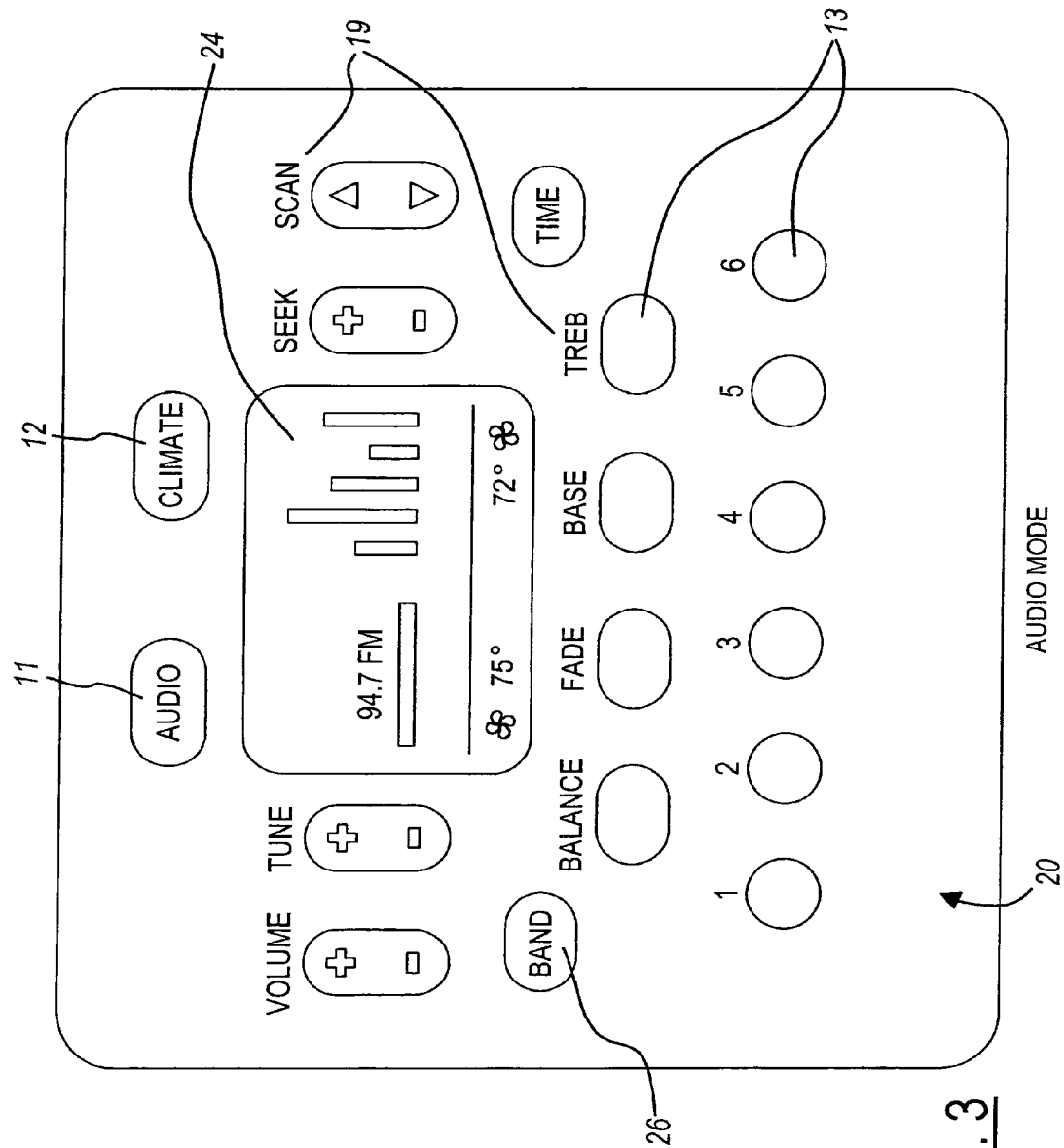
FIG. 3 is a front view of an integrated center console stack illustrating a first set of accessory controls in a first mode according to a preferred embodiment of the present invention.

There is shown in FIG. 1 a perspective view of a prior art center console stack 20 within the interior of a vehicle for controlling a plurality of vehicle accessories. The center console stack 20 includes a plurality of segregated accessory controls. The center console stack 20 comprises a multimedia control unit 21 and a heating, ventilation, and cooling (HVAC) control unit 22. The multimedia control unit 21 includes a multimedia display, a CD player and a plurality of multimedia contact control switches. Control switches may include CD, radio, fast forward, reverse, seek up, seek down, tune, search, band, or preset memory.

The HVAC unit 22 includes a temperature display and a plurality of contact switches for making selections to control operation of the HVAC system. Typical switches required for controlling HVAC system functionality include temperature increase/decrease, defrost, A/C, heated seating, blower motor, and blower motor output porting.

The plurality of accessory control switches utilizing the segregated accessory controls are numerous and utilize a majority of the center stack console surface area thereby cluttering the center console stack 20. Often to alleviate the appearance of being over-populated, the plurality of accessory control switches may be small in size, however, this may make locating and actuating a respective switch difficult.

FIG. 2 illustrates a block diagram of an integrated accessory control unit utilizing reconfigurable switches for enabling a vehicle accessory system. A vehicle accessory control system 10 includes a plurality of switches and controls for activating a plurality of accessory functions. The vehicle accessory control system 10 includes a first mode selector switch 11 for enabling a plurality of controls for controlling a first set of accessory functions 16 such as a multimedia system. A second mode selector switch 12 enables a plurality of controls for controlling a second set of accessory functions 17 such as a HVAC system. The vehicle accessory control system 10 further includes a plurality of accessory switches 13, illumination elements 14, and a microcontroller 15. In the preferred embodiment the plurality of accessory switches are non-contact switches. However, in other preferred embodiments, contact switches may be used such as membrane or conventional switches. The non-contact switches are embedded within a planar member of a bezel of a control panel. When using a respective non-contact switch, the respective switch is capable of actuating at least two respective vehicle accessories non-simultaneously. As a result, dual functionality can be offered through the incorporation of one embedded switch.

When at least one selector switch is actuated such as the first mode selector switch 11, the microcontroller 15 receives an input signal and enables the first set of accessory functions 16, namely the functionality of the multimedia controls, via the accessory switches 13. A first set of illumination elements 14 is activated for illuminating a first set of graphics 19. The first set of graphics 19 show graphical illustrations (i.e., either pictorials and/or words) for identifying the functionality of each respective accessory switch for the enabled first set of accessory functions 16.

When the selector switch 12 is actuated, the microcontroller 15 receives a respective input signal and enables a second set of accessory functions 17, namely the functionality of the HVAC controls, via the accessory switches 13. A second set of illumination elements 18 is activated for illuminating a second set of graphics 29. The second set of graphics 29 show graphical illustrations identifying the functionality of each respective accessory switch for the enabled second set of accessory functions 17. As a result of utilizing the reconfigurable accessory switches, the number of switches can be minimized, thus adding to the aesthetic appearance of the control panel in comparison to a control panel utilizing conventional switches with only single functionality which would require substantially twice the number of switches on the surface of the control panel.

In the preferred embodiment, the non-contact switches include control switches that utilize an electric field sensor to detect an object (e.g. finger) that disturbs the electric field. The object selectively displaced within the electric field changes the electric field thereby producing a potential variation within the electric field. The potential variation is associated with a user request to activate a vehicle accessory. Non-contact switches may be produced using field effect, piezoelectric, capacitive, or optical sensing technology.

FIG. 3 shows a vehicle accessory control panel illustrating the accessory switches for controlling the first set of accessory functions. The plurality of accessory switches 13 is disposed on the front surface of the center console stack 20. An accessory display screen 24 shows the current operating details of the selected accessory. The first mode selector switch 11 (i.e., audio) and second mode selector switch 12 (i.e., climate) are illuminated for selecting between multimedia functionality and HVAC functionality. When the first mode selector switch 11 is actuated for enabling the multimedia functions, the first set of illumination elements 14 illuminate the first set of graphics 19 for displaying the multimedia functionality of each respective accessory switch. The graphics for the first set of switches 19 may be disposed above each respective switch while a next set of graphics for a next accessory function utilizing the same switch may be disposed elsewhere about the switch. In other preferred embodiments, the location of graphics for a respective set of switch functions may be disposed at any location about each switch. When the microcontroller 15 (shown in FIG. 1) receives an input signal indicating the first mode selector switch 11 is actuated, the microcontroller 15 enables the first set of accessory functions 16 (i.e., multimedia functions) for activation by the plurality of accessory switches 13. Actuating a respective accessory switch will activate a respective accessory function of the enabled accessory. Various multimedia operating details such as volume, station identification number, and station call letters may be displayed on the accessory display screen 24. Operating details of other accessories (e.g., temperature) may also be displayed on the accessory display screen 24 in a less conspicuous location to provide information to a driver of the vehicle about other operating accessories without defocusing the drivers attention from the selected accessory. Furthermore, the display screen 24 may include a touch screen such as a LCD, OLED, or vacuum florescence touch screen. The touch screen may also be reconfigurable to a respective vehicle accessory system in response to enabling a respective set of accessory switch functions.

Figure 4:
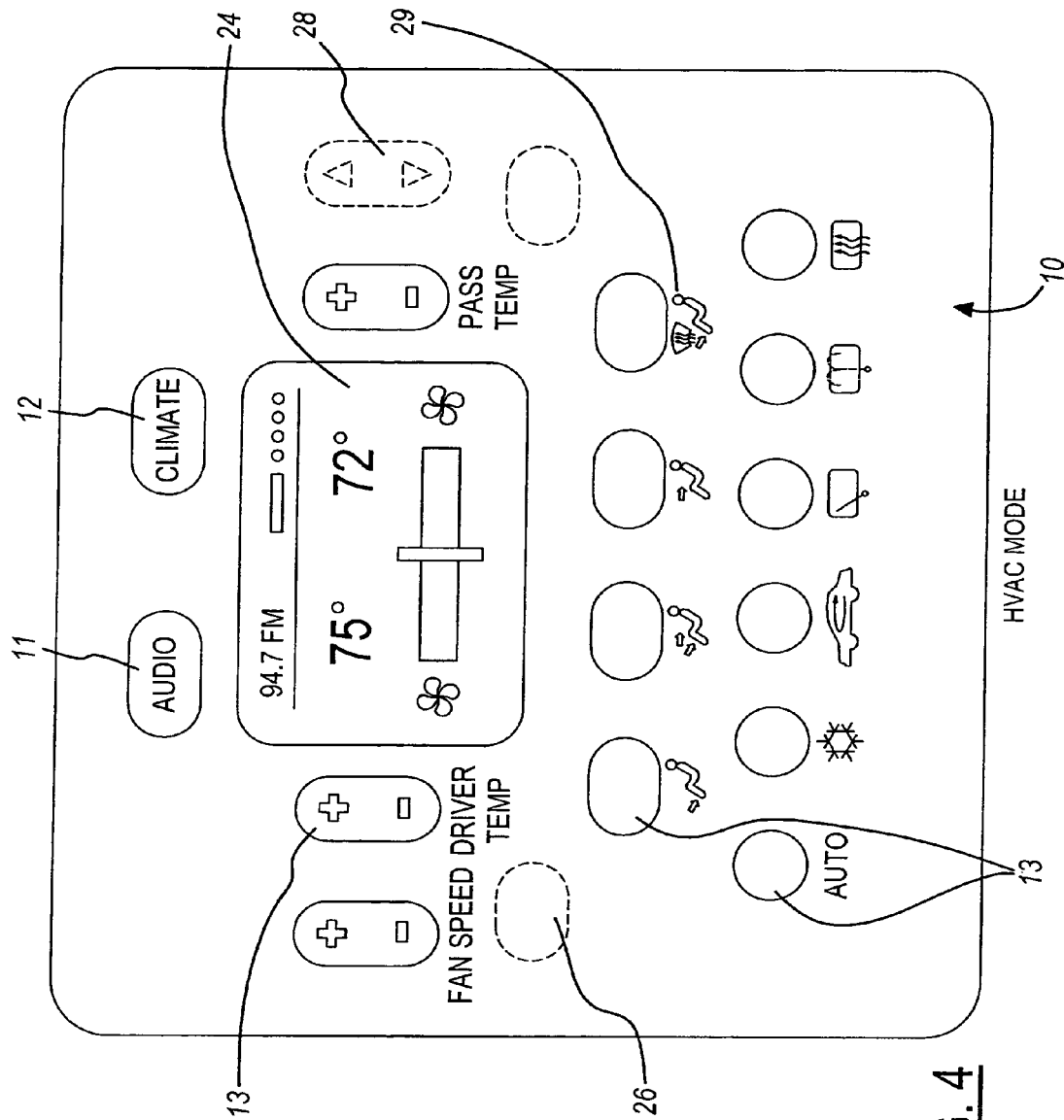
FIG. 4 is a front view of an integrated center console stack illustrating a second set of accessory controls in a second mode according to a preferred embodiment of the present invention.

FIG. 4 illustrates the vehicle accessory control panel showing the accessories for controlling the second set of accessory functions. When the second mode selector switch 12 is actuated for enabling the second set of accessory functions such as the HVAC functions, the second set of illumination elements 18 illuminate the second set of graphics 29 for displaying the HVAC functionality of each respective accessory switch. The graphics for the second set of switches 29 are disposed below each respective switch. Alternatively, the location of graphics identifying the second set of switch functions may be disposed at other locations about each respective switch. Alternatively, the switch itself may include the illuminating graphics.

The illumination elements for illuminating both the first set of graphics 19 and second set of graphics 21 may comprise a plurality of LEDs for illuminating a respective region of each graphic to identify the enabled associated accessory function. Either the graphic may be illuminated or the graphic may be painted with an opaque material such that an area surrounding the graphic will be highlighted. If the graphic elements of the first set of graphics 19 and the second set of graphics 29 are so close in proximity to one another that utilizing a respective LED to illuminate a respective graphic may undesirably illuminate a graphic proximal to the intended graphic, then light piping may be used to direct the illumination source to the intended graphic. In yet another preferred embodiment, electroluminescent lighting may be used to illuminate each respective set of graphics. It should be appreciated that various lighting schemes other than those described may be used individually or in combination with one another to illuminate a respective set of graphics.

Dependent upon the number of accessory switches that are required to provide controls for an enabled accessory (i.e., if there are more accessory switches than accessory functions for a respective accessory), then an unused accessory switch for a respective set of switch functions preferably will not illuminate when that accessory is enabled. For example, in FIG. 3, if the first mode selector switch 11 representing the multimedia accessory functionality is actuated, the respective multimedia graphics will be illuminated for each associated switch enabled. A band switch 26 and a scan switch 28 are enabled for the multimedia accessories and the associated graphics are illuminated. If the second set of accessory functions 16, shown in FIG. 4, does not utilize the band switch 26 and the scan switch 28 for accessory functionality, then when the second set of accessory functions 17 are enabled the band switch 26 and the scan switch 28 will not illuminate and no accessory functionality will be active from these switches.

To assist a user who is unfamiliar with vehicle accessory control system, upon energizing the vehicle accessory control system (e.g., engine start, key on, or accessory run) the microcontroller 15 (shown in FIG. 1) implements a wakeup protocol that includes a sequential illumination learning mode scheme that visually identifies each mode selector switch and the respective set of accessory switch functions associated with each respective selector switch. FIG. 5 illustrates a method for implementing the learning mode scheme. In step 30, the vehicle accessory control system is energized by either an engine start, key on, or accessory on. In step 31, all selector switches are illuminated. In step 32, a respective selector switch remains illuminated while all other selector switches dim. In step 33, a respective set of graphics associated with the illuminated selector switch illuminates. In step 34, the illuminated selector switch and the illuminated set of graphics dims. In step 35, a next selector switch illuminates. In step 36, a next set of graphics associated with said next selector switch is illuminated. In step 37, the next selector switch and the next set of graphics dim.

In step 38, a determination is made whether all respective selector switches and associated graphics were illuminated. If a determination is made in step 38 that other selector switches and associated graphics have yet to be illuminated, then a return is made to step 35. If a determination is made in step 38 that each of the respective selector switches and associated graphics have been illuminated then the learning program terminates in step 39 and all selector switches illuminate and their associated graphics remain non-illuminated until a respective selector switch is actuated. Alternatively, in step 39, if a respective accessory set of switch functions was enabled when the vehicle accessory system was last de-energized (e.g., engine off, accessory off, key off) then the vehicle accessory control system may default to that last activated accessory and the associated illumination switches are enabled and associated graphics are illuminated.

FIG. 6 illustrates a method for controlling vehicle accessories from the vehicle accessory control system. In step 41, a plurality of switches is provided on a control panel. The plurality of switches is reconfigurable to provide at least two sets of accessory switch functions. In step 42, a plurality of graphics is disposed about said plurality of graphics for identifying said functionality of said plurality of switches. Alternatively, the plurality of graphics may be disposed on the plurality of switches. In step 43, a plurality of illumination elements is provided for illuminating the plurality of graphics. In step 44, a controller is provided for controlling the selection and activation of at least two sets of switch functions. The controller enables a respective set of switches for actuation when a respective selector switch is actuated.

In step 45, a respective set of switches are enabled in response to an actuation of a respective selector switch for activating accessory functions of the selected accessory. In step 46, all respective selector switches other than the selector switch actuated is dimmed. In step 47, the respective set of graphics associated with the actuated selector switch is illuminated. Alternatively, the graphics illuminated in step 46 and 47 may be illuminated substantially simultaneously. It should also be noted that the dimming of a graphic or a set of graphics and the illumination of a next respective graphic or set of graphics may be performed substantially simultaneously.

In accordance with the provisions of the patent statutes, the principle and mode of operation of the present invention have been explained and illustrated in its preferred embodiment. However, it must be appreciated that the present invention can be practiced otherwise than as specifically explained and illustrated without departing from its spirit or scope.

The invention claimed is:

1. A vehicle accessory control panel for controlling at least two vehicle accessory systems, said control panel comprising:
   a plurality of switches that is reconfigurable to provide at least two sets of switch functions;
   a plurality of graphics for identifying switch functions;
   a plurality of illumination elements for illuminating said plurality of graphics;
   a first mode selector switch for selecting said first mode; and
   a second mode selector switch for selecting said second mode;
   wherein said switches are reconfigurable in first and second non-simultaneous modes to enable a respective set of accessory switch functions for controlling a respective vehicle accessory system, wherein a respective set of illumination elements is activated for illuminating a respective set of graphics identifiable with a selected set of accessory switch functions, wherein a first set of graphics identifies a first set of accessory switch functions in response to enabling said first set of accessory switch functions, wherein a second set of graphics identifies a second set of accessory switch functions in response to enabling said second set of accessory switch functions, wherein a wakeup protocol includes a sequential illumination learning mode scheme for visually identifying each said respective set of accessory switch functions, and wherein said learning mode scheme sequentially illuminates a respective mode selector switch and respective graphics for identifying said respective set of accessory switch functions associated with said respective mode switch.

2. The control panel of claim 1 wherein said respective set of illumination elements for illuminating said respective set of graphics are responsive to enabling said respective set of accessory switch functions.

3. The control panel of claim 1 wherein said switches are non-contact switches.

4. The control panel of claim 1 wherein said plurality of illumination elements includes electroluminescent elements for illuminating said plurality of graphics.

5. The control panel of claim 1 further comprising a touch screen, said touch screen is configurable to said respective vehicle accessory system in response to said enabling said respective set of accessory switch functions.

6. A vehicle accessory control system for controlling a plurality of vehicle accessories in a vehicle, said control system comprising:
- a plurality of switches that is reconfigurable to provide at least two sets of accessory switch functions;
- a plurality of graphics disposed on said plurality of switches;
- a plurality of illumination elements for illuminating said plurality graphics;
- at least one controller for controlling the selection and activation of said at least two sets of switch functions;
- a first mode selector switch for selecting a first set of accessory switch functions; and
- a second mode selector switch for selecting a second set of accessory switch functions;
- wherein said controller receives a control input from said mode selector switches to select a respective set of accessory switch functions, said controller reconfigures said switches to operate in first and second non-simultaneous modes and enables said selected respective set of accessory switch functions in response to said control input and illuminates a respective set of graphics for identifying said respective set of accessory switch functions, and wherein said controller implements a wakeup protocol, wherein said wakeup protocol includes a sequential illumination learning mode scheme for visually identifying of each said respective set of accessory switch functions, said learning mode scheme sequentially illuminates a respective mode selector switch and respective graphics for identifying said respective set of accessory switch functions associated with said respective mode switch.

7. The control system of claim 6 wherein said wakeup protocol initiates said sequential illumination learning mode scheme upon energizing said vehicle accessory control system.

8. The control system of claim 6 wherein a first set of graphics identify a first set of accessory switch functions in response to enabling a first set of accessory switch functions.

9. The control system of claim 8 wherein said first set of accessory switch functions includes multimedia functions.

10. The control system of claim 6 wherein a second set of graphics identify a second set of accessory switch functions in response to enabling a second set of accessory switch functions.

11. The control system of claim 10 wherein said second set of accessory switch functions includes HVAC functions.

12. The control system of claim 6 wherein said switches are non-contact switches.

13. A method for activating vehicle accessory controls from a vehicle instrument panel using a reconfigurable switch panel, the method comprising the steps of:

- providing an accessory control unit disposed in said instrument panel;
- providing a plurality of reconfigurable switches disposed in said accessory control unit including switches operable in first and second non-simultaneous modes;
- providing a plurality of illumination elements for illuminating a plurality of graphics, each respective graphic is identifiable with a respective switch function;
- initiating a wakeup protocol, wherein said wakeup protocol includes a sequential illumination learning mode scheme for visually identifying each said respective set of accessory switch functions according to each respective mode comprising:
  - a. energizing said accessory control unit;
  - b. illuminating a first mode selector switch and a second mode selector switch;
  - c. dimming a first mode selector switch and illuminating a second mode selector switch and said respective set of graphics associated with said second mode selector switch;
  - d. dimming a second mode selector switch and said respective set of graphics and illuminating said first mode selector switch and said respective set of graphics associated with said first selector switch;
  - e. dimming said first mode selector switch and said respective set of graphics associated with said first mode selector switch; and
- reconfiguring said reconfigurable set of switches of said accessory control unit for a respective set of accessory switch functions in response to a control input, wherein a respective set of illumination elements illuminate according to a respective mode for identifying enabled switch functions.

14. The method of claim 13 further comprising the step of illuminating said first selector mode switch and said second mode selector switch after step d.

15. The method of claim 13 further comprising the step of illuminating a respective mode selector switch and respective graphics associated with a last enabled set of accessory switch functions after step d.

16. The method of claim 13 wherein said respective set of accessory switch functions are reconfigured for providing multimedia functionality.

17. The method of claim 13 wherein said respective set of accessory switch functions are reconfigured for providing HVAC functionality.

* * * * *